UNITED STATES PATENT OFFICE.

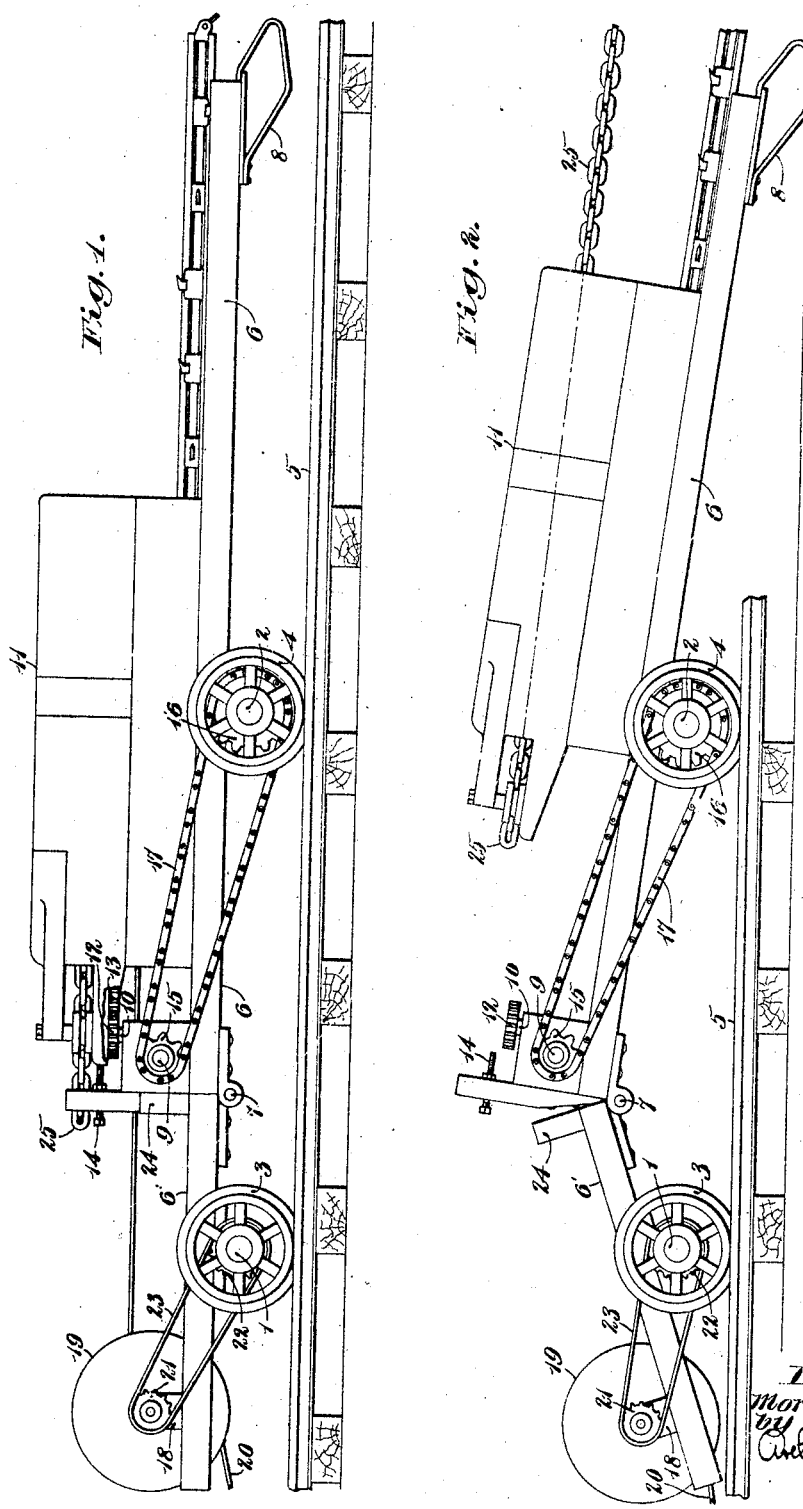

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,812.  Specification of Letters Patent.  Patented May 17, 1921.

Application filed December 12, 1918. Serial No. 266,479.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide a counterbalanced, tilting truck of the jack-knife type, which will remain in a tilted position after the unloading of the mining machine but which will be automatically returned to a horizontal position when the machine is loaded onto the truck.

In the accompanying drawings I have shown for purposes of illustration one embodiment which my invention may assume in practice.

In these drawings,—

Figure 1 is a side elevation of my improved truck with the mining machine thereon in loaded position.

Fig. 2 is a side elevation of the truck with the mining machine in unloading or loading position.

Referring to the drawings, I have there shown, for the purpose of illustrating the principal features of the invention, a four-wheel truck having two axles 1 and 2 supported by wheels 3 and 4 mounted on a track 5. The axles 1 and 2 are connected through suitable axle boxes (not shown) with two sections 6' and 6 of a truck frame, these sections being pivotally connected, as by a hinge 7.

The front truck section 6, which may be termed the body, bed, or main truck frame, since it is the larger frame and is adapted to receive the load, extends in front of the front axle 2 for a considerable distance and carries at the front end a forwardly extending, reversed frame member 8 which limits the swinging movement of the main truck frame and serves as a skid to facilitate the loading of the mining machine onto the truck. At its rear end this main truck frame or body section is provided in a well known manner with a transverse truck driving shaft 9 and a substantially vertically disposed shaft 10, the latter being driven by the mining machine 11 through suitable spur gears 12, 13 and in turn driving the shaft 9 through a worm and worm gear (not shown). Suitable means, such as a set screw 14, is provided for limiting the movement of the mining machine onto the truck so as to prevent injury to the spur gears 12, 13 and to hold these gears in their proper spaced relation. This truck bed may, if desired, be balanced about the axle 2, but such a construction is not essential to the tilting of this member to permit the loading or unloading of the machine.

In the form of my improvement herein shown, the truck driving means includes a driving member or sprocket 15 mounted on the shaft 9, a driven member or sprocket 16 mounted on the axle 2 and a flexible connection, as a chain 17, connecting said members or sprockets. When the mining machine is in loaded position, the truck is driven in either direction along the track by the mining machine motor and the driving connections just described.

The rear or trailer truck section 6', which may be termed the reel section, trailer, counterbalancing section, or smaller truck section, is partially supported by the axle 1 and in part by the main frame section 6 through the hinged connection 7, and carries near its rear end a reel supporting member 18 and a reel 19 mounted thereon, the latter being adapted to carry a cable 20 or a hose to supply current or compressed air to the mining machine motor. In my improvement I have provided means for rotating the reel or drum to pay out or take up the cable as the truck is moved along the track, this means in the form herein disclosed comprising sprocket wheels 21, 22 mounted, respectively, on the reel 19 and axle 1, and a chain 23 engaging these sprocket wheels. Obviously, through the construction just described, when the truck is driven along the track by the mining machine motor, the wheels 3 will rotate the drum to pay out the cable as the truck moves to the right (as shown in the drawings) or to pick up the cable as the truck moves to the left. Mounted on the end of the reel section adjacent the body section, are a plurality of stops or abutments 24 (only one being shown), rigidly secured to the end of the frame 6' and adapted to contact with the end of the frame 6 in such a manner as to limit the relative movement of the frames 6, 6' during the loading operation so that these members will occupy a substantially horizontal position when the mining machine 11 is loaded.

In the use of this improved construction it will be readily understood that when the mining machine is being unloaded from the truck by means of the usual feed chain 25, the weight of the mining machine will tilt the frame 6 on the front axle as a fulcrum until the shoe strikes the mine floor, when the machine may be run off. During this tilting of the frame 6, the reel section 6' is also tilted, but the parts are preferably so proportioned that the rear end thereof will not strike the track and thus cause breakage of the reel support or other parts of the truck. Attention is directed to the fact that all the driving connections are maintained during this tilting movement and that no means are required to keep the driving chains from loosening and falling off from the sprockets. If desired, the forward end of the frame 6 may project far enough beyond the axle 2 to overbalance the rear end of this frame and normally retain the latter tilted. In such a construction the reel may be placed nearer, or over, the axle 1, or if for any reason the counterbalancing action of the forward end of the frame 6 is too great, the reel may be placed between the axle 1 and the hinge 7 to partially counterbalance this extra weight.

While I have stated that thus truck is of the jack-knife type, it should be noted that it differs materially from the usual jack-knife trucks in that the break in the truck frame does not come in that part of the frame which receives the mining machine, but at the rear thereof, so that I obtain the benefits inherent in a solid bed truck. It will be noted from the drawing (Fig. 1) that the mining machine is supported chiefly by the front axle, the center of gravity of the machine being a little to the rear of this axle. By this construction the reel member constitutes a counterbalancing member to hold the main frame 6 tilted when the mining machine is unloaded and contributes but little to the support of the mining machine when the latter is loaded. This construction may be varied by placing the axle 2 nearer the front end of the frame 6, but this construction is open to objection in that when the mining machine is loaded the increased tilting movement of the machine about the axle 2 will cause the truck to move rapidly to a horizontal position and will tend to break the hinge and strain the cable support and chain.

While I have herein shown and described one embodiment which my invention may assume in practice, it is to be understood that this form is shown for illustrative purposes and that the invention may be modified and embodied in various other forms without departing from its spirit.

What I claim as new and desire to secure by Letters Patent is:

1. In a mining machine truck, a tiltable truck body, a wheeled pivot therefor, said body being tiltable about the pivot to loaded or unloading position by a mining machine movable thereover, and trailer means having a separate wheeled mounting engaging the body at one end thereof for supporting that end when said body is loaded.

2. In a mining machine truck, a tiltable truck body, a wheeled pivot therefor, said body being tiltable about the pivot to loaded or unloading position by a mining machine movable thereover, and trailer means engaging the body at one end thereof for supporting that end when said body is loaded and for normally retaining said body in an inclined position.

3. In a mining machine truck, a tiltable truck body, a wheeled supporting member therefor having a single axle, said body being tiltable about the member to loaded or unloading position by a mining machine movable thereover, and trailer means having a separate wheeled mounting engaging the body at one end thereof for supporting that end when said body is loaded.

4. In a mining machine truck, a tiltable truck body, a wheeled supporting member therefor having a single axle, said body being tiltable about the member to loaded or unloading position by a mining machine movable thereover, and trailer means engaging the body adjacent one end thereof for supporting that end when said body is loaded and for normally retaining said body in an inclined position.

5. In a mining machine truck, a tiltable truck body, a wheeled pivot therefor, said body being tiltable about the pivot to loaded or unloading position by a mining machine movable thereover, and counterbalancing trailer means engaging the body adjacent one end thereof for supporting that end when said body is loaded and for normally retaining said body in an inclined position.

6. In a mining machine truck, a tiltable truck body, a single wheeled supporting member therefor, said body being tiltable about the member to loaded or unloading position by a mining machine movable thereover, and counterbalancing trailer means engaging the body adjacent one end thereof for supporting that end when said body is loaded and for normally retaining said body in an inclined position.

7. In a mining machine truck, a tiltable truck body, a wheeled pivot therefor, said body being tiltable about the pivot to loaded or unloading position by a mining machine movable thereover, and reel supporting means engaging the body at one end thereof at a point beyond the farthest movement of the mining machine in loading for supporting that end when said body is loaded and for normally retaining said body in an inclined position.

8. In a mining machine truck, a tiltable truck body, a single wheeled supporting member therefor, said body being tiltable about the member to loaded or unloading position by a mining machine movable thereover, and reel supporting trailer means engaging the body adjacent one end thereof for supporting that end when said body is loaded and for normally retaining said body in an inclined position.

9. In a mining machine truck, a tiltable truck unit including a truck bed, a single wheeled supporting member therefor and truck driving mechanism thereon, said bed being tiltable to loaded or unloading position by a mining machine movable thereover, and a wheeled counterbalancing truck unit hingedly connected to the first named truck unit at one end thereof and comprising a wheeled frame, a reel supported thereby, and a reel rotating means mounted thereon.

10. In a mining machine truck, a tiltable truck unit including a truck bed, a single wheeled supporting member therefor and truck driving mechanism thereon, said bed being tiltable to loaded or unloading position by a mining machine movable thereover, and a wheeled counterbalancing truck unit hingedly connected to one end of the first named truck unit and comprising a tiltable frame mounted on a single wheeled supporting member, a reel supported by said frame, and a reel rotating means mounted thereon, said counterbalancing unit being adapted to support one end of the bed when the latter is loaded and being also adapted to normally retain the bed in an unloading position.

11. In a mining machine truck, coöperating single axled truck units, one comprising a rigid tiltable machine receiving frame and the other comprising a supplemental trailer frame, and means operatively connecting the rear end of said machine receiving frame and said trailer frame.

12. In a mining machine truck, coöperating single axled truck units, one comprising a rigid tiltable machine receiving frame and the other comprising a supplemental trailer frame, and means for pivotally connecting said machine receiving frame at a point adjacent its rear end to the front end of said trailer frame.

13. In a mining machine truck, a plurality of coöperating operatively connected single axled truck units, one comprising a rigid tiltable machine receiving frame and the other comprising a supplemental trailer frame, and means on the adjacent ends of said frames coöperating to support the rear end of said machine receiving frame when the latter is loaded.

14. In a mining machine truck, a plurality of single axled truck units, one comprising a machine receiving frame and the other comprising a trailer frame, a pivotal connection between the rear end of said receiving frame and said trailer frame, and a reel carried on said trailer frame.

15. In a mining machine truck, a plurality of single axled truck units, one comprising a machine receiving frame and the other comprising a trailer frame, a pivotal connection between the rear end of said receiving frame and said trailer frame, a reel carried on the rear end of said trailer frame, and truck driving mechanism carried on the rear end of said machine receiving frame.

16. In a mining machine truck, a plurality of single axled truck units, one comprising a machine receiving frame and the other comprising a trailer frame, a pivotal connection between the rear end of said receiving frame and said trailer frame, a reel carried on the rear end of said trailer frame, truck driving mechanism carried on the rear end of said machine receiving frame, and operative connections for said reel and truck driving mechanism connected to the wheels of their respective units.

17. In a mining machine truck, a pair of wheeled truck elements each having a single axle about whose axis it is tiltable, a reel on one of said elements, truck driving means on the other thereof, a pivotal connection between the adjacent ends of said truck elements, and abutment means on each of said truck elements having surfaces adapted to abut in a vertical plane to limit the movement of said truck elements upon loading thereof.

18. In a mining machine truck, a pair of wheeled truck elements each having a single axle about whose axis it is tiltable, a reel on one of said elements, truck driving means on the other thereof, a pivotal connection between the adjacent ends of said truck elements, and abutment means on each of said truck elements having surfaces adapted to abut in a vertical plane to cause said truck elements to come to rest, upon loading thereof, when in alinement.

In testimony whereof I affix my signature.

MORRIS P. HOLMES.